(12) United States Patent
Nakamura et al.

(10) Patent No.: US 9,090,086 B2
(45) Date of Patent: Jul. 28, 2015

(54) INK-JET RECORDING APPARATUS AND INK-JET RECORDING SYSTEM

(75) Inventors: Takashi Nakamura, Yokohama (JP); Akitoshi Yamada, Yokohama (JP); Okinori Tsuchiya, Yokohama (JP); Akihiko Nakatani, Kawasaki (JP); Mitsuhiro Ono, Tokyo (JP); Ayumi Sano, Kawasaki (JP); Takashi Fujita, Kawasaki (JP); Tomokazu Ishikawa, Kawasaki (JP); Hidetsugu Kagawa, Kawasaki (JP); Yugo Mochizuki, Kawasaki (JP); Fumihiro Goto, Kawasaki (JP); Fumitaka Goto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 12/965,617

(22) Filed: Dec. 10, 2010

(65) Prior Publication Data

US 2011/0148969 A1     Jun. 23, 2011

(30) Foreign Application Priority Data

Dec. 22, 2009   (JP) ................................. 2009-290107

(51) Int. Cl.
*B41J 2/205* (2006.01)
*B41J 2/21* (2006.01)
*H04N 1/50* (2006.01)
*H04N 1/60* (2006.01)

(52) U.S. Cl.
CPC .............. *B41J 2/2146* (2013.01); *H04N 1/508* (2013.01); *H04N 1/6033* (2013.01)

(58) Field of Classification Search
CPC ...................................................... B41J 2/2146
USPC ............................................................ 347/15
See application file for complete search history.

(56) References Cited

U.S. PATENT DOCUMENTS

| 5,189,521 | A | 2/1993 | Ohtsubo |
| 7,591,521 | B2 * | 9/2009 | Aruga ............................. 347/13 |
| 2003/0001918 | A1 * | 1/2003 | Tsuchiya et al. ................ 347/19 |
| 2005/0024652 | A1 * | 2/2005 | Gondek ......................... 358/1.9 |
| 2005/0073707 | A1 | 4/2005 | Yamazoe |
| 2007/0120883 | A1 | 5/2007 | Tsuboi |

FOREIGN PATENT DOCUMENTS

| JP | 3040433 B2 | 5/2000 |
| JP | 2004-122546 A | 4/2004 |
| JP | 2005-110089 A | 4/2005 |
| JP | 2007-152582 A | 6/2007 |
| JP | 2007-190862 A | 8/2007 |

* cited by examiner

*Primary Examiner* — Manish S Shah
*Assistant Examiner* — Jeffrey C Morgan
(74) *Attorney, Agent, or Firm* — Canon U.S.A., Inc. IP Division

(57) ABSTRACT

In an overlapping head including a plurality of recording head chips overlapped to each other, a color shift can occur between a color recorded by an overlapping region and a color recorded by a non-overlapping region, which cannot be corrected by a density correction using head shading or the like. To correct such a color shift, a test pattern is recorded by the overlapping region and the non-overlapping region and colors of the recorded test pattern are measured. Color correction data to be used in correction of colors of an image to be recorded is generated based on a result of the measurement of the colors.

17 Claims, 13 Drawing Sheets

INK-JET RECORDING APPARATUS AND INK-JET RECORDING SYSTEM

BACKGROUND OF THE INVENTION

1. Field of the Invention

The present invention relates to an ink-jet recording apparatus and an ink-jet recording system configured to record an image on a recording medium by discharging ink, measure colors of the recorded image, and generate color correction data based on a result of the measurement. More particularly, the present invention relates to an ink-jet recording apparatus and an ink-jet recording system having an overlapping head including a plurality of recording head chips overlapped to each other.

2. Description of the Related Art

There are many known recording methods for image recording apparatuses such as printers. In particular, printers using an ink-jet recording method are widely used in many applications varying from those for consumer use to those for industrial use such as a large-format printer. In a known type of ink-jet recording apparatus, ink is discharged from a recording head having a discharge port array including a plurality of discharge ports so as to record an image on a recording medium.

This type of ink-jet recording apparatus uses a method such as a serial recording method in which recording is performed while scanning a recording head over a recording medium, a full-line recording method in which a recording medium is conveyed with respect to a full-line head including a plurality of recording head chips arranged in an array, etc. Among those methods, the full-line recording method has a feature that the full-line recording head is capable of recording an image over the full width of a recording medium and thus recording is possible simply by conveying the recording medium in a direction crossing a direction in which a discharge port array is arranged, which makes it possible to perform the recording at a high speed.

In such a full-line recording head, it is possible to achieve a great recordable width by overlapping recording head chips for the same color such that an end region of each recording head chip is overlapped to an end region of an adjacent recording head chip. In the present description, a full-line head including a plurality of recording head chips whose end portions are overlapped to each other is referred to as an "overlapping head". In general, the overlapping head is constructed such that adjacent recording head chips partially overlap each other, and image data to be recorded is distributed in each overlapping region of recording head chips.

A positioning error occurs when recording head chips are assembled together in production of a head, and the positioning error can produce color unevenness, streaks, etc., which can cause degradation in image quality. Several techniques have been proposed to deal with the image quality degradation. For example, Japanese Patent Laid-Open No. 2007-152582 discloses a technique in which a gradation mask is used to gradually distribute recording data over an overlapping region of each recording head chip of an overlapping head so that white or black streaks occurring in overlapping regions are shaded.

It is also known that a difference in size of ink dots discharged from discharge ports can produce streaks or color unevenness, which can cause degradation in image quality. The variation in ink dot size can occur due to several factors. For example, one factor is a variation in discharge port diameter that can occur when recording head chips are produced. Another factor is a variation in discharge energy, which can cause an error in dot size. To handle this situation, Japanese Patent No. 3040433 discloses a technique using head shading. More specifically, in this technique, a predetermined specific pattern is recorded on a recording medium and the recorded pattern is read to detect unevenness in recorded color density for each nozzle (discharge port). The unevenness in density is compensated for based on the detection result.

The present applicant has found that positioning errors in assembling of recording head chips can not only produce white/black streaks but also can cause other degradation in image quality. More specifically, positioning errors of recording head chips can cause ink droplets to hit wrong positions on a recording medium, which can cause a recorded image to have a difference in color (in hue, saturation, brightness, etc.) between an area recorded by a overlapping region and an area recorded by a non-overlapping region.

In this case, even when the recorded image has the same color for all areas recorded by non-overlapping regions of the recording head chips, the areas recorded by the overlapping regions have colors different from the color of the areas recorded by the non-overlapping regions, as described in further detail below with reference to FIGS. 2A to 2D.

FIG. 2A illustrates recording head chips A and B positioned with a slight positioning error. Note that these two recording head chips are assumed to discharge the same amount of ink with the same color, and the same color is recorded by the non-overlapping regions of the two recording head chips. FIG. 2B and FIG. 2C illustrate images recorded by the overlapping region. The image shown in each figure is of one pixel including nine dots. The gray level of the one pixel is represented by a combination of these nine dots. In the recording of these pixels shown in FIGS. 2A and 2B, image data is distributed to the recording head chip A and the recording head chip B, and ink is discharged at all nine dots.

FIG. 2B illustrates a comparative example in which the image is recorded by an overlapping region having no positioning error. FIG. 2C illustrates an example in which the image is recorded by an overlapping region having a positioning error such as that shown in FIG. 2A. In the example shown in FIG. 2B, ink dots in the pixel are formed at correct positions without overlapping each other. In contrast, in the example shown in FIG. 2C, ink dots in the pixel are formed at wrong positions due to the positioning error and thus overlapping occurs between dots formed on the recording medium by ink discharged by the recording head chip A and dots formed by ink discharged by the recording head chip B. The color of the image varies depending on a dot covering ratio on the recording medium and an overlapping ratio, and thus the color of the pixel shown in FIG. 2C is different from that shown in FIG. 2B although the pixel equally has nine dots.

In the case where there is no assembling error as in the example shown in FIG. 2B, the color is the same for the non-overlapping region and the overlapping region. However, if there is a positioning error as in the example shown in FIG. 2C, a difference in color occurs between the non-overlapping region and the overlapping region. If an image includes a plurality of such pixels located close to each other, the result is a great difference in color, which cannot be neglected.

The difference in color of the overlapping region from the non-overlapping region can occur in all overlapping regions. That is, in the case where recording is performed using the recording head having the structure realized by overlapping a plurality of recording head chips for the same color as with an example shown in FIG. 2D, a color shift due to an ink dot positioning error occurs at as many locations as there are overlapping regions (equal to the number of recording head chips minus one). The color shift can cause the recorded image to have a visually perceivable streak with a color different from the color of areas recorded by the non-overlapping regions, which results in degradation in image quality. To assemble the recording head chips such that no color shift occurs, the recording head chips may be assembled with high positioning accuracy, or high-precision recording head chips, which are expensive semiconductor devices, may be selected according to necessary characteristics, which can lead to a reduction in production yield. However, this leads to a great increase in cost.

The color shift due to overlapping of dots is difficult to avoid even when the gradation mask disclosed in Japanese Patent Laid-Open No. 2007-152582 is used. As described above, in the technique using the gradation mask, distribution ratios of discharge ports are gradually distributed in the overlapping region. That is, in a case where the overlapping region is not large enough to allow the process using the gradation mask to provide a sufficient effect as in a case where the overlapping region includes, for example, only one discharge port array, it is difficult to reduce the color shift due to overlapping of ink dots caused by ink dot positioning errors.

It is also difficult to avoid the color shift of this type by using the head shading technique disclosed in Japanese Patent No. 3040433, because head shading is a technique to correct an error of recording density due to an error of the amount of recording material discharged. That is, the color shift due to overlapping of dots caused by dot positioning errors is not a color shift caused by an error of recording density of a color and thus it is difficult to make a correction by the head shading technique disclosed in Japanese Patent No. 3040433.

SUMMARY OF THE INVENTION

In view of the above, the present invention provides an ink-jet recording apparatus capable of recording a test pattern that can measure a color in an area recorded by an overlapping region of an overlapping head and perform proper color correction.

According to an aspect of the present invention, there is provided an ink-jet recording apparatus including a recording unit including a recording head having a first discharge port array and a second discharge port array, the first discharge port array and the second discharge port array each including a plurality of ink discharge ports arranged in a predetermined direction, the first discharge port array and the second discharge port array having overlapping regions in which an end region of the first discharge port array and an end region of the second discharge port array overlap each other in a scanning direction crossing the predetermined direction, wherein an image is recorded by discharging ink while relatively moving the recording head in the scanning direction with respect to a recording medium, wherein the recording head includes a first discharge port group including discharge ports of the first discharge port array exclusive of discharge ports located in the overlapping region, and a second discharge port group including discharge ports of the first discharge port array and the second discharge port array located in the overlapping region, the ink-jet recording apparatus further including a color correction data generation unit configured to generate color correction data, for use in performing a color correction on image data to be recorded, based on a result of a colorimetric measurement on a first test pattern recorded by the first discharge port group and based on a result of a colorimetric measurement on a second test pattern recorded by the second discharge port group. Moreover, a color correction unit is supplied that is configured to perform a color correction of image data to be recorded, using the color correction data generated by the color correction data generation unit.

As described above, the ink-jet recording apparatus is capable of properly performing the color correction on the area recorded by the overlapping region of the overlapping head including a plurality of recording head chips overlapped to each other.

Further features of the present invention will become apparent from the following description of exemplary embodiments with reference to the attached drawings.

DESCRIPTION OF THE EMBODIMENTS

The present invention is described in further detail below with reference to embodiments in conjunction with the accompanying drawings.

First Embodiment

Recording Apparatus

Figure 3:
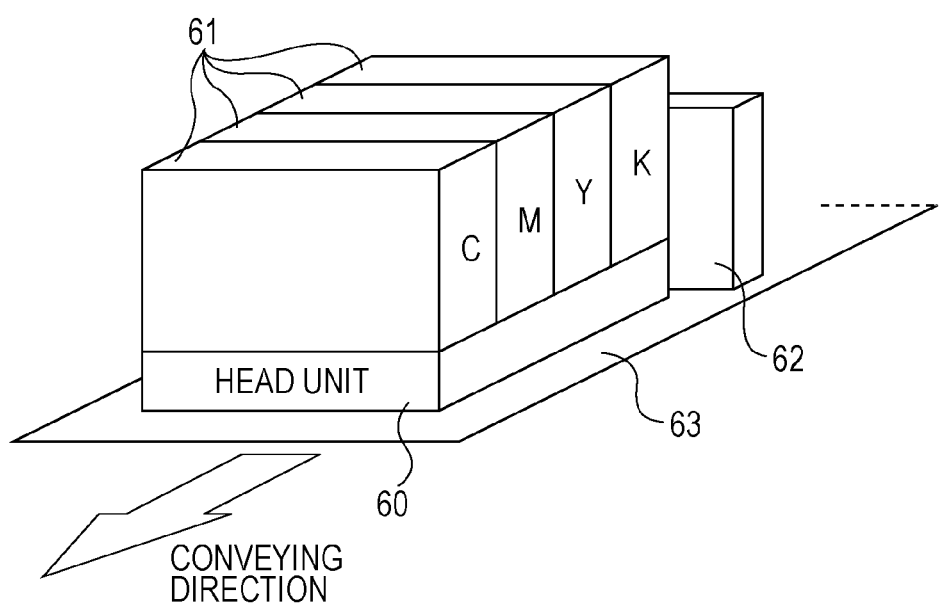
FIG. 3 is a schematic diagram illustrating a configuration of a recording apparatus according to an embodiment of the present invention.

FIG. 3 is a schematic diagram illustrating a configuration of an ink-jet recording apparatus according to an embodiment of the present invention. A head unit 60 serves as a recording unit on which ink storage units 61 for storing ink serving as recording materials are mounted. A control circuit unit 62 includes a ROM 74 and a RAM 75 serving as storage units used in driving of the head unit 60, a CPU 72 serving as an operation unit, and an interface serving as a communication unit. The head unit 60 receives a recording signal and a control signal from the control circuit unit 62 and discharges ink from discharge ports of recording elements based on the recording signal according to the control signal. A recording medium 63 is conveyed over a supporting plate (not shown) in a conveying direction (scanning direction) shown in FIG. 3 by a conveying roller (not shown). Using the ink-jet recording apparatus configured in the above-described manner, an image is recorded on the recording medium. Note that although in the example shown in FIG. 3 there are four ink storage units 61 for storing cyan (C) ink, magenta (M) ink, yellow (Y) ink, and black (K) ink, there is no particular restriction on the number and colors of ink storage units 61.

Figure 4:
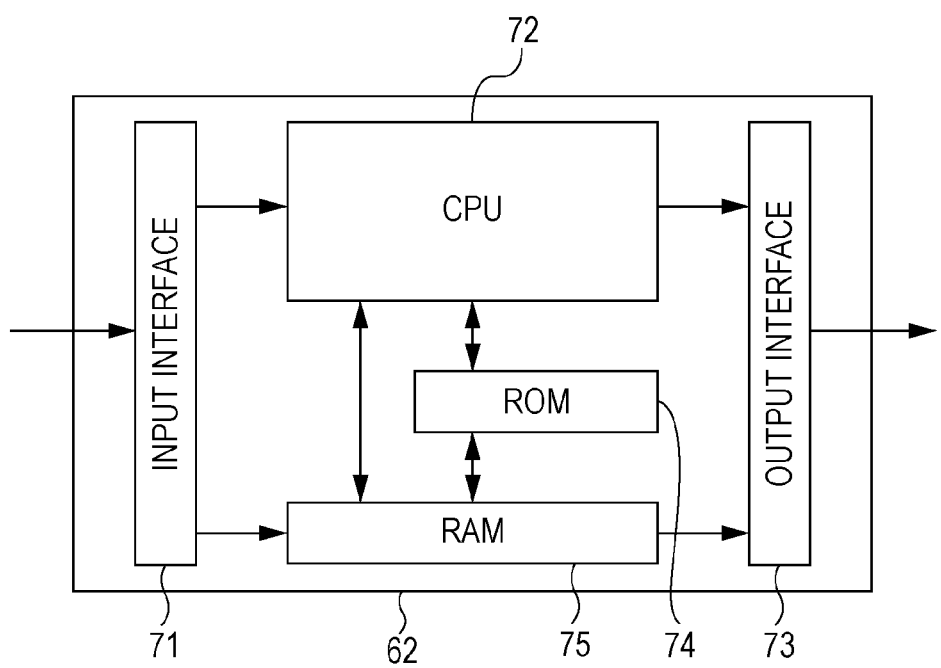
FIG. 4 is a block diagram illustrating an internal configuration of a control circuit unit of a recording apparatus according to an embodiment of the present invention.

FIG. 4 is a block diagram illustrating the control circuit unit 62. The control circuit unit 62 includes an input interface 71, a CPU 72, an output interface 73, a ROM 74, and a RAM 75. The input interface 71 provides an interface that allows it to input an image signal and control signals including a head driving signal from an external unit/apparatus such as an operation unit (not shown) of the printer or a computer (not shown). The image signal and the control signals including the driving signal are sent to the RAM 75 and/or the CPU 72 from the input interface 71 and are processed. To process the image signal, a control program stored in the ROM 74 is executed and signal processing is performed. The resultant image signal subjected to the process described above is output together with the control signals including the head driving signal via an output interface 63. The image signal and the control signals including the head driving signal associated with the image signal are output in the above-described manner, and an image is recorded by driving the head unit 60. Note that the ROM 74 may be replaced with a non-volatile rewritable storage device.

System Configuration

Figure 5:
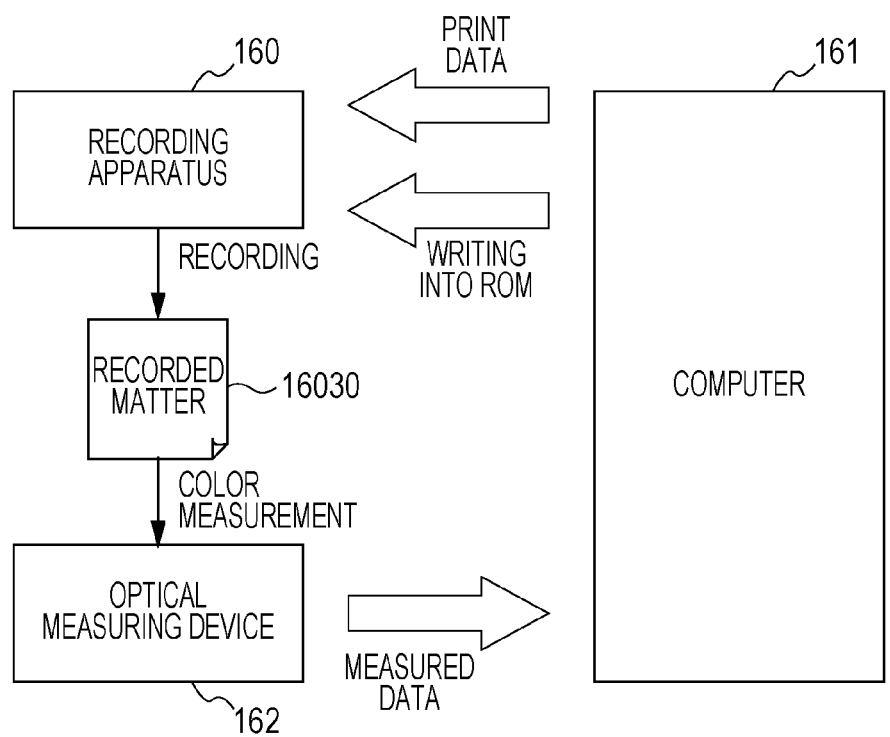
FIG. 5 is a block diagram illustrating a recording apparatus and associated external apparatuses.

FIG. 5 is a block diagram illustrating a system according to an embodiment of the present invention. An ink-jet recording apparatus 160 records an image using the control circuit unit 62 described above. The ink-jet recording apparatus 160 is also capable of recording an image according to image data received directly from a computer 161 serving as a recording data supplying apparatus disposed outside the ink-jet recording apparatus 160. An optical measuring device 162 serving as a measuring unit optically measures an image recorded by the ink-jet recording apparatus 160. The optical measurement is performed for all recorded matters including a patch of a test pattern, which will be described later. Measurement data obtained via the measurement by the optical measuring device 162 is sent to the computer serving as a correction unit. In the system configured in the above-described manner, the ink-jet recording apparatus records the image according to data specified by the computer, and the optical measuring device reads the recorded image and sends data of the read image to the computer and can compare the color signal read with the color signal commanded to be recorded. The computer 161 is capable of storing image processing tools, such as a control program and a color correction table, in the ROM 74 disposed in the control circuit unit 62 shown in FIG. 4.

Details of Recording Unit

Figure 6:
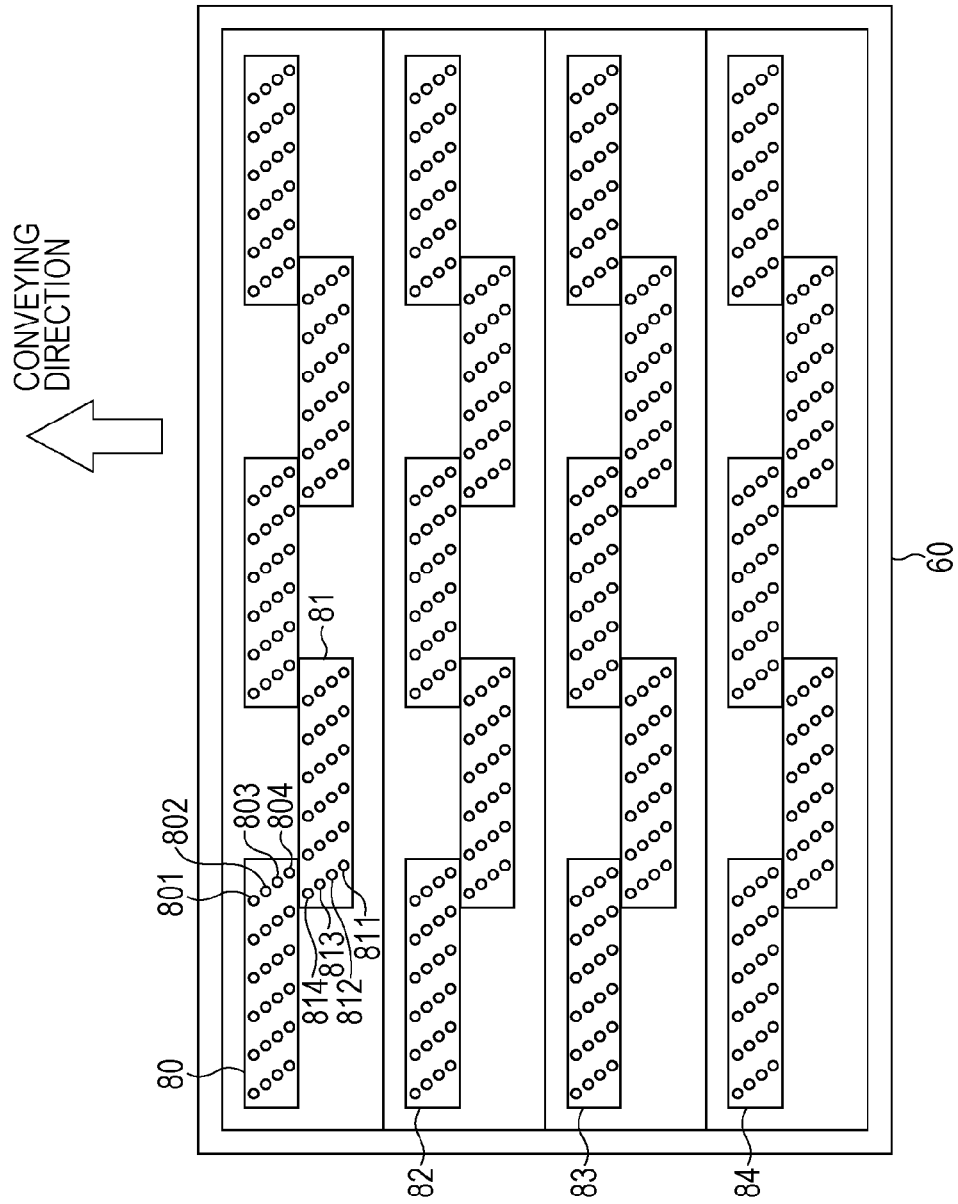
FIG. 6 is a diagram illustrating a multichip head according to an embodiment of the present invention.

FIG. 6 is a diagram schematically illustrating the head unit 60. A recording head chip 80 is a chip that discharges cyan ink. Similarly, recording head chips 82, 83, and 84 discharges magenta ink, yellow ink, and black ink. A recording head chip 81 is a chip that discharges cyan ink as with the recording head chip 80. The recording head chip 80 includes first discharge port arrays, i.e., discharge port arrays 801, 802, 803, and 804 in each of which discharge ports for discharging ink are arranged in the form of an array. The recording head chip 81 includes second discharge port arrays, i.e., discharge port arrays 811, 812, 813, and 814. The recording head chips 80 and 81 are disposed such that end regions of discharge port arrays of these recording head chips 80 and 81 overlap each other in a conveying direction (scanning direction) crossing a direction (predetermined direction) in which the discharge port arrays are arranged and such that locations of second discharge ports in the overlapping region of the recording head chip 81 correspond to locations of first discharge ports in the overlapping region of the recording head chip 80. In the present embodiment, of the discharge ports of the first discharge port arrays, discharge ports located in non-overlapping regions are referred to as first discharge port groups, and, of the discharge ports of the first discharge port arrays and the second discharge port arrays, discharge ports located in overlapping regions are referred to second discharge port groups. Note that in the present embodiment, the overlapping regions of respective colors are located in the same area. That is, the overlapping regions of all ink colors are located such that the same area on the recording medium is recorded by these overlapping regions.

Color Correction Process

Figure 7:
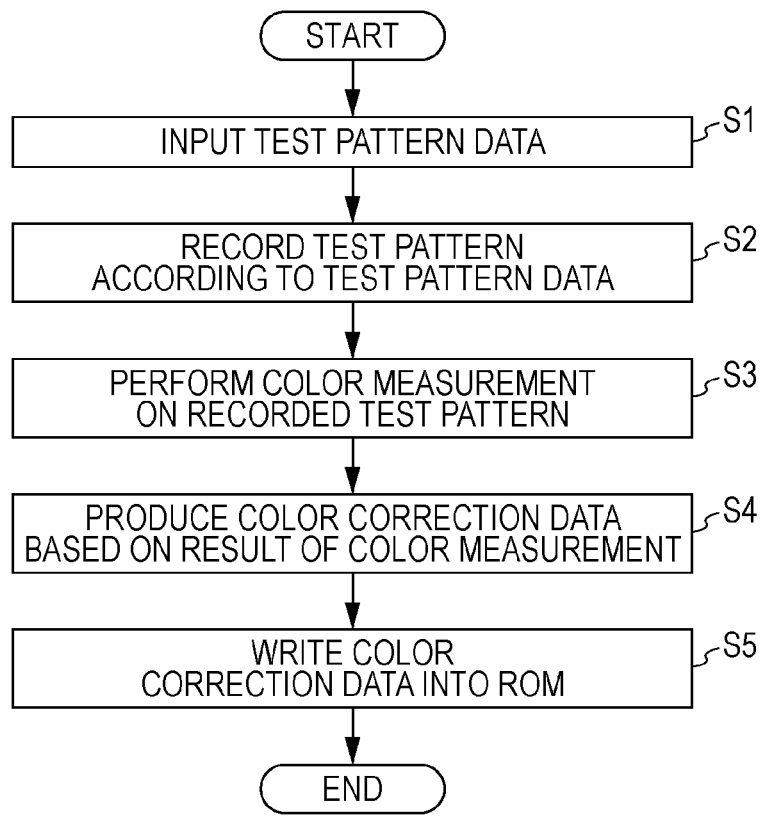
FIG. 7 is a flow chart illustrating a process of generating color correction data according to an embodiment of the present invention.

FIG. 7 is a flow chart illustrating a color correction process. In the present embodiment, the color correction process involves recording a test pattern including a plurality of patches, measuring colors of the recorded test pattern, generating correction data based on the measurement result, and making a correction using the correction data. First, in step S1, test pattern data to be used in recording the test pattern is input to the recording apparatus 160 from the computer 161. In step S2, a test pattern for the color correction is recorded. As described in further detail later, the test pattern is recorded in both areas corresponding to the overlapping region and the non-overlapping region of the recording head chip. In the recording of the test pattern, the test pattern data is distributed among discharge ports of overlapping regions of two recording head chips (i.e., over a second discharge port group). Next, in step S3, colors of the recorded test pattern are measured. In step S4, color correction data is generated based on a result of the color measurement of the test pattern. In step S5, the generated color correction data is written in the ROM 74 in the recording apparatus.

Figure 11:
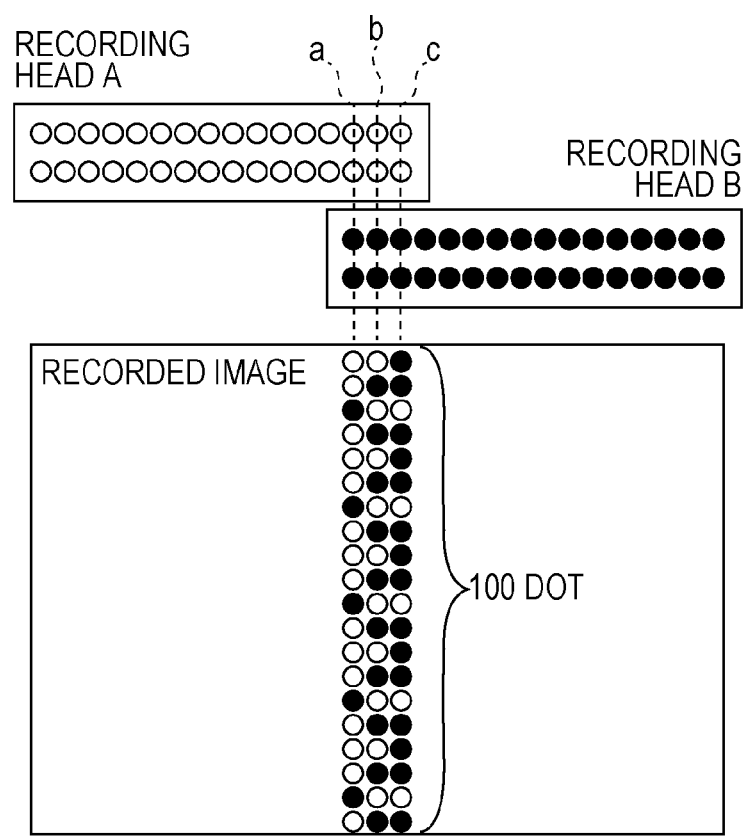
FIG. 11 is a diagram illustrating a manner of distributing image data in an overlapping region.

Next, referring to FIG. 11, a distribution ratio (discharge port distribution ratio) associated with the overlapping region of each recording head chip is described below. In the present description, the distribution ratio associated with a chip is defined as a relative number of dots assigned to the chip when 100 ink dots are formed on a recording medium by an overlapping region of the recording head. More specifically, in the recorded image shown in FIG. 11, 75% of the image data is distributed to the recording head chip 80 while 25% of the image data is distributed to the recording head chip 81 in a line a. In a line b, 50% of the image data is distributed to recording head chips 80 and 81. In a line c, 25% of the image data is distributed to the recording head chip 80 while 75% of the image data is distributed to the recording head chip 81. In the present embodiment, a mask is used as a distribution unit to distribute the image data in accordance with the distribution ratio described above. Note that the distribution ratio of discharge ports of recording head chip is given by the dot distribution ratio described above.

Figure 8:
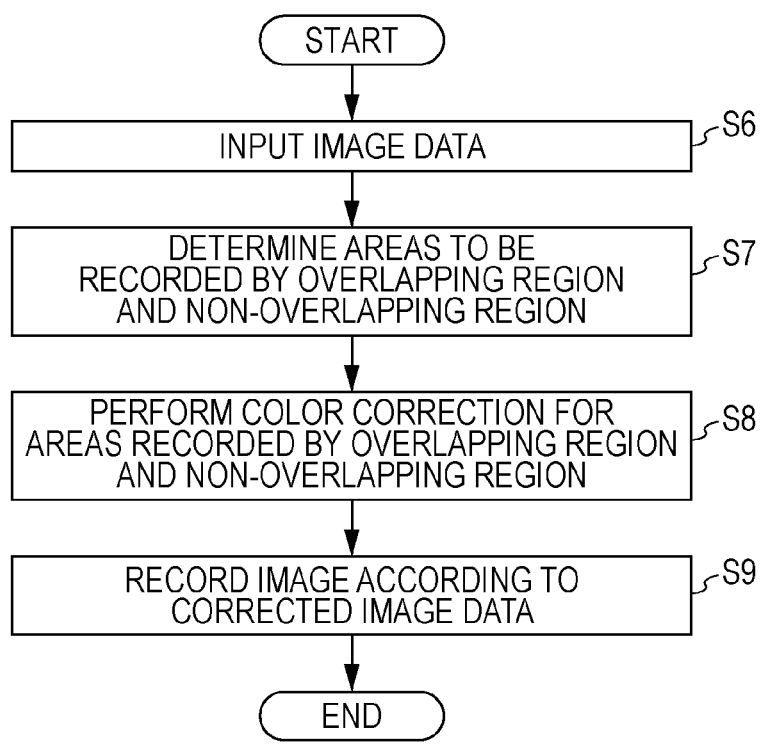
FIG. 8 is a flow chart illustrating a color correction process according to an embodiment of the present invention.

Next, referring to a flow chart shown in FIG. 8, a process of recording an image according to corrected image data is described below. First, in step S6, image data to be used in recording an image is input to the recording apparatus 160 from the computer 161. Next, in step S7, a determination is made as to the correspondence between each pixel of the image data and a discharge port of the recording head chip 80 or the recording head chip 81, and areas recorded by the overlapping region and the non-overlapping region are determined. In step S8, the image data is corrected in terms of the color of the overlapping region and the non-overlapping region based on the color correction data generated in the process described above with reference to the flow chart shown in FIG. 7. In step S9, an image is recorded using the corrected image data. In the recording, the gradation mask is used to distribute the image data in the overlapping region according to the determined discharge port distribution ratio. The method of the color correction will be described in further detail later.

Test Pattern

Figure 9A:
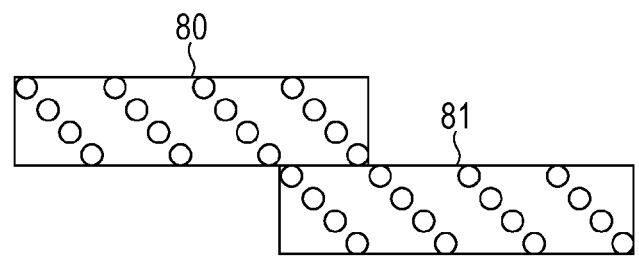
FIGS. 9A and 9B are diagrams for an illustration of a test pattern according to an embodiment of the present invention.
Figure 9B:
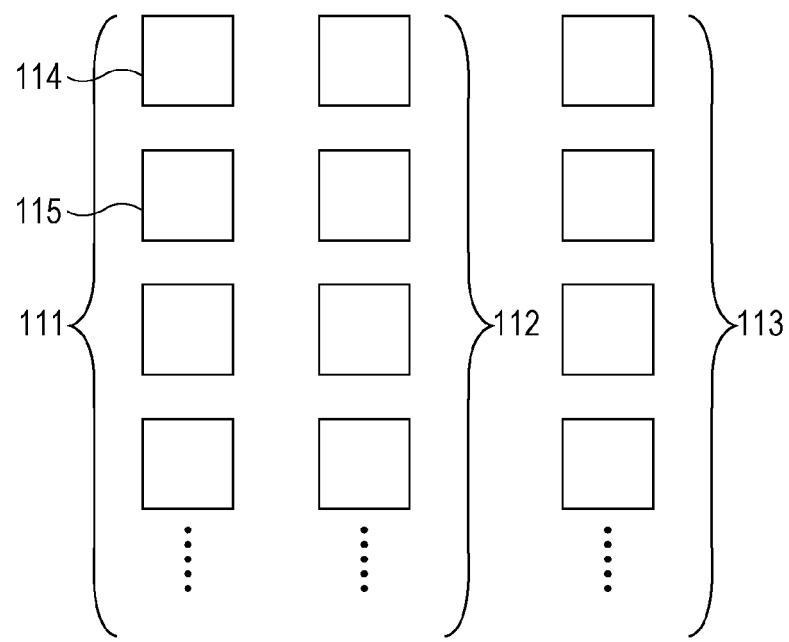

Next, referring to FIGS. 9A and 9B, the test pattern recorded in step S2 in FIG. 7 is described in further detail below. In the present embodiment, the test pattern is for correcting a color shift that occurs between an image area recorded by an overlapping region of a recording head chip and an image area recorded by a non-overlapping region of the recording head chip. For this purpose, the test pattern includes patches to be recorded by the overlapping region and patches to be recorded by the non-overlapping region. FIG. 9A illustrates an overlapping head formed by overlapping the recording head chips 80 and 81 shown in FIG. 6 that discharge cyan ink. FIG. 9B illustrates patch groups of the test pattern recorded by the overlapping region and the non-overlapping region of the recording head chips 80 and 81. More specifically, a patch group 111 forming a first part of the test pattern is recorded only by the recording head chip 80, i.e., by the non-overlapping region of the recording head chip 80. Note that the patch group 111 includes an array of patches including a patch 114, a patch 115, etc., with different colors. A patch group 112 forming a second part of the test pattern is recorded by the overlapping region of the recording head chip 80 and the recording head chip 81. Note that the patch group 112 includes a similar array of patches with different colors as with the patch group 111. Similarly, a patch group 113 forming a third part of the test pattern is recorded by the non-overlapping region of the recording head chip 81.

In the present embodiment, the patch groups 111, 112, and 113 are respectively recorded according to patch data representing particular color values, i.e., particular RGB values. The colors of the recorded patches are measured by a method described below, and color correction data used in making a color correction on image data used in recording an image is generated based on colorimetric data obtained via the color measurement.

Figure 10A:
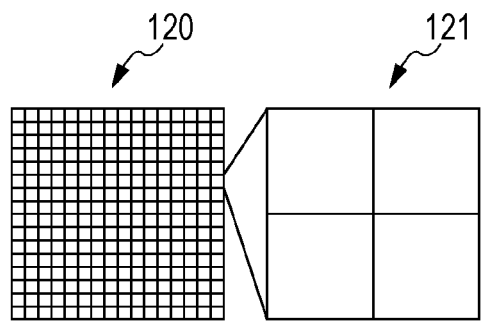
FIGS. 10A and 10B are diagrams illustrating binary image data of a test pattern according to an embodiment of the present invention.
Figure 10B:
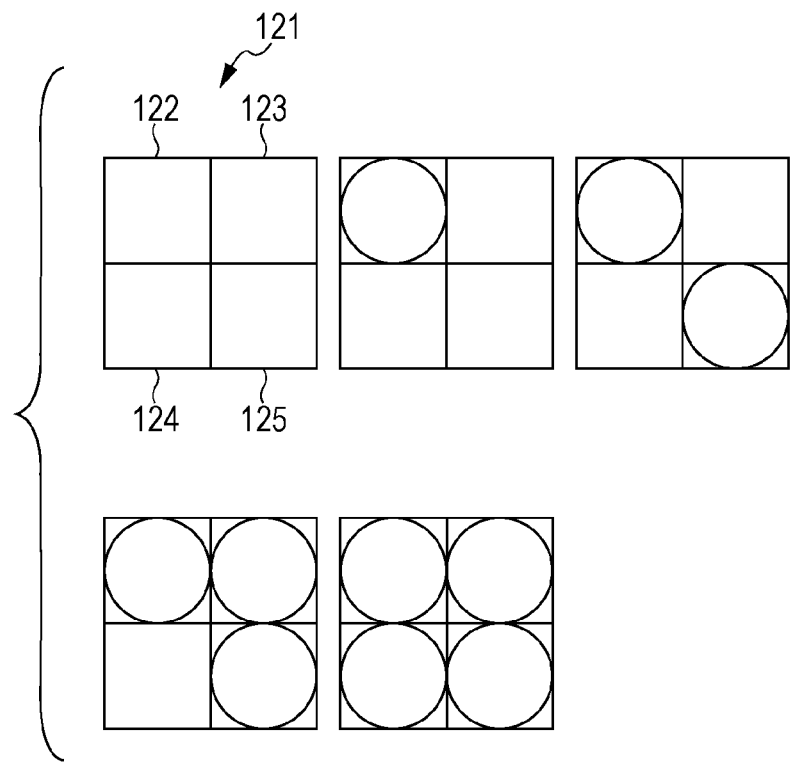

FIGS. 10A and 10B schematically illustrate, in an enlarged manner, one of pixels forming a patch. Note that in this example, one pixel includes four dots and the gray level of the pixel is represented by a combination of these four dots.

FIG. 10A illustrates in the enlarged fashion a pixel 121 which is one of pixels of a patch 120. FIG. 10B illustrates a method of representing the gray level of one pixel. More specifically, in this method, one pixel 121 is divided into four cells 122, 123, 124, and 125, and ink droplets are discharged such that one or more cells are hit by ink droplets depending on the gray level to be represented. By selecting the total number of ink droplets hitting cells of the pixel within a range from 0 to 4, it is possible to represent five gray levels. In the present embodiment, as described above, a patch is a representation of a color by a plurality of pixels each including a plurality of cells, and a collection of a plurality of patches is referred to as a patch group. Note that there is no particular restriction on the number of patches of a patch group. A test pattern including patch groups is recorded in an area corresponding to an overlapping region of a recording head chip and also in an area corresponding to a non-overlapping region of the recording head chip. Note that the configuration of the test pattern is not limited to that described above, but patches may be recorded simultaneously in each area or may be recorded separately.

Image data corresponding to an overlapping region of two recording head chips may be distributed to the two recording head chips in many ways. For example, image data may be distributed using a mask pattern. Another example is to distribute image data to each chip according to the distribution ratio. In the case where the recording data is generated using the mask pattern, the mask pattern indicates which one of the two recording head chips is used to discharge ink. By taking the AND of the mask pattern and the image data, the image data to be recorded by each recording head chip is obtained.

Colorimetry Method

Next, the method of measuring colors of the recorded test pattern is described below. In the present embodiment, colorimetric data is acquired by using the optical measuring device 162 described above with reference to FIG. 5. More specifically, the colorimetric data may be acquired by a spectrophotometer such as "Spectrolino" available from Gretag-Macbeth Co. Note that a spectroscopic characteristic obtained via the measurement using the spectrophotometer depends on a characteristic of a light source used to illuminate patches and physical conditions of patches. Alternatively, the colorimetric data may be obtained by scanning the image using an optical scanner and detecting a signal value corresponding to the spectral reflectance.

Method of Generating Color Correction Data

Next, a method of generating color correction data based on colorimetric data is described below. Note that the term "color correction data" is used to widely describe any data that allows color correction. For example, in a case where a color conversion is performed using a matrix, transformation coefficients represented by matrix elements are determined. In a case where the color conversion is performed using a three-dimensional look-up table, the look-up table is determined. In the present embodiment, the color correction data is generated by the computer 161 serving as a correction unit.

In the present embodiment, by way of example, the transformation coefficient of the matrix are determined from the colorimetric data of patches. First, colors of patches recorded by the overlapping region and non-overlapping region are measured using the optical measuring device 162. Note that the measurement may be performed for an arbitrary RGB color, but colorimetric data obtained by measuring the RGB colors is represented in the same color space for both the overlapping region and non-overlapping region. For example, in a case where patches recorded by the overlapping region are read as raw data, patches recorded by the non-overlapping region are also read as raw data. In the following description, it is assumed by way of example that the RGB values are represented in a sRGB color space for both the overlapping region and the non-overlapping region.

The sRGB values read for the non-overlapping region is converted into XYZ values, and a higher-order matrix H with an arbitrary order is generated from the sRGB values read for the overlapping region. For example, in a case where there are n patches and a 1st-order matrix is generated, a matrix with n rows×3 columns such as that shown in mathematical expression (1) is generated.

$$H = \begin{pmatrix} R_1 & G_1 & B_1 \\ R_2 & G_2 & B_2 \\ R_3 & G_3 & B_3 \\ \cdots & \cdots & \cdots \\ R_n & G_n & B_n \end{pmatrix} \quad (1)$$

In a case where a 2nd-order matrix is generated, a matrix with n rows×10 columns such as that shown in mathematical expression (2) is generated. In mathematical expression (2), C denotes a constant term that may be included.

$$H = \begin{pmatrix} R_1 & G_1 & B_1 & R_1^2 & G_1^2 & B_1^2 & R_1G_1 & R_1B_1 & B_1G_1 & C_1 \\ R_2 & G_2 & B_2 & R_2^2 & G_2^2 & B_2^2 & R_2G_2 & R_2B_2 & B_2G_2 & C_2 \\ R_3 & G_3 & B_3 & R_3^2 & G_3^2 & B_3^2 & R_3G_3 & R_3B_3 & B_3G_3 & C_3 \\ \cdots & \cdots & \cdots & \cdots & \cdots & \cdots & \cdots & \cdots & \cdots & \cdots \\ R_n & G_n & B_n & R_n^2 & G_n^2 & B_n^2 & R_nG_n & R_nB_n & B_nG_n & C_n \end{pmatrix} \quad (2)$$

Next, a pseudo-inverse matrix I is generated from the higher-order matrix H. The pseudo-inverse matrix I may be generated, for example, by a method disclosed in Japanese Patent Laid-Open No. 2005-110089 published Apr. 21, 2005. Japanese Patent Laid-Open No. 2005-110089 is hereby incorporated by reference herein in its entirety. A color correction matrix M is then generated from the pseudo-inverse matrix I for the target XYZ values obtained by converting the RGB values of the non-overlapping region. The color correction matrix M may be generated by a method, for example, disclosed in Japanese Patent Laid-Open No. 2005-110089 in which the method of generating the pseudo-inverse matrix I is also disclosed.

Figure 1:
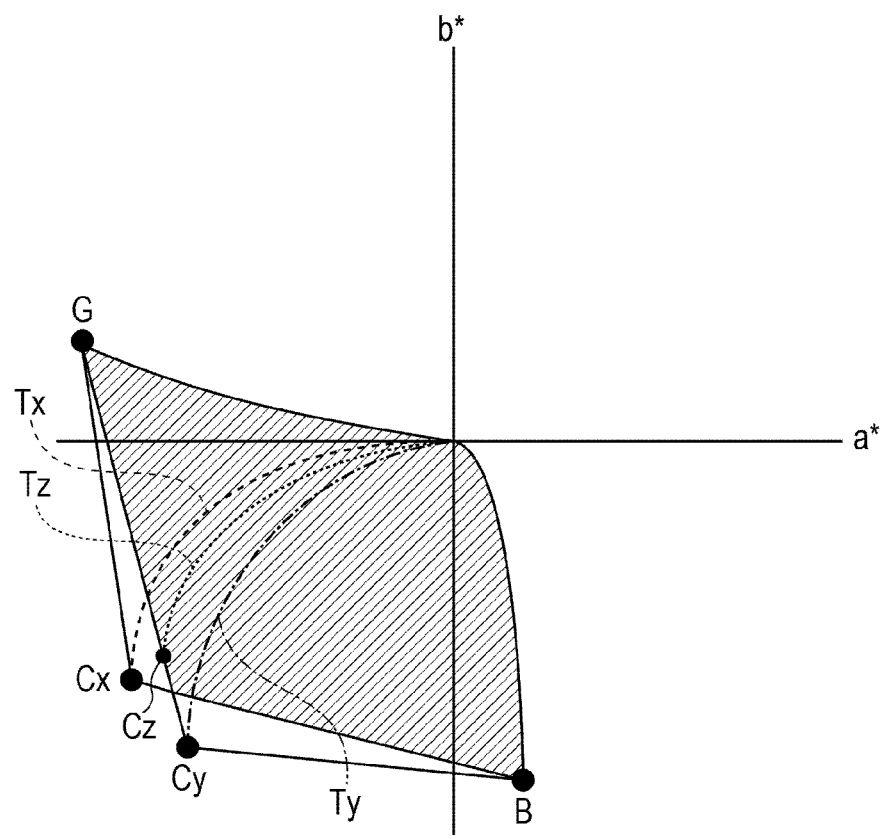
FIG. 1 is a diagram illustrating a color gamut of an overlapping head.
Figure 2A:
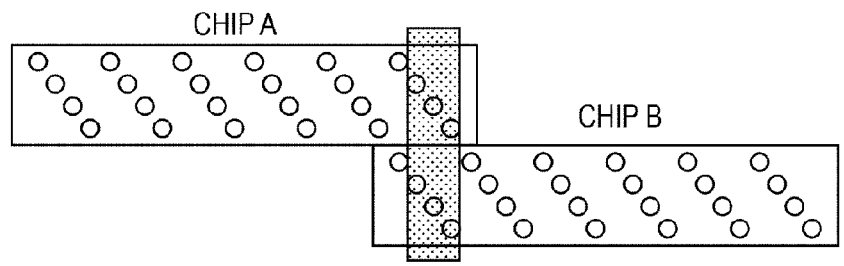
FIGS. 2A to 2D are diagrams for an illustration of overlapping of dots due to a positioning error of recording head chips.
Figure 2B:
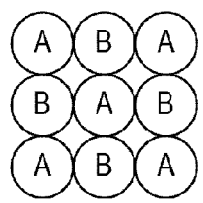
Figure 2C:
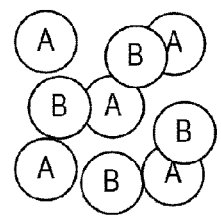
Figure 2D:
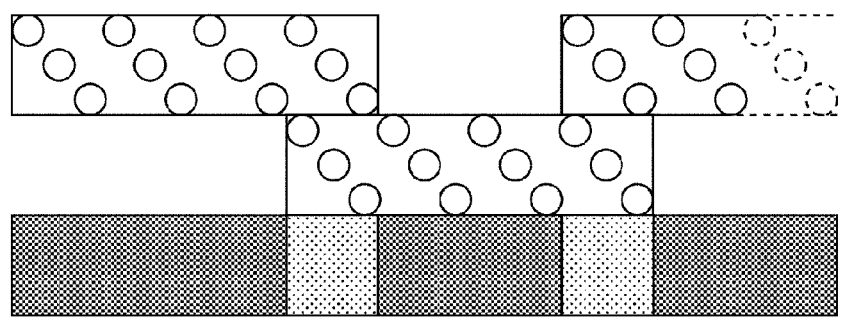

Next, colors to be corrected are discussed below. FIG. 1 illustrates a color variation from white of a recording medium (i.e., a color of the recording medium itself on which no recording material is deposited) to a color obtained by recording a single color of cyan as a recording material with a maximum recording density. In FIG. 1, a horizontal axis represents an a* axis in a CIE-L*a*b* color space, and a vertical axis represents a b* axis. In FIG. 1, a locus Tx is obtained by mapping color values in the CIE-L*a*b* color space onto an a*b* plane for colors from the white color (the color of the recording medium itself on which no ink is deposited) to the color formed by depositing a maximum allowable amount of ink on the recording medium for the case where the colors are recorded by the non-overlapping region. A locus Ty is obtained by mapping for a case where the colors are recorded by the overlapping region with a distribution ratio of 50%. As can be seen from FIG. 1, the color shift between Tx and Ty increases with increasing amount of recording material, i.e., with increasing saturation. This results in a slight difference in shape between a color space GCxB and a color space GCyB spanned by maximum allowable recording densities of green and blue, which are primary colors adjacent to each other, which causes a difference in recorded color even for the same RGB signal value. Note that in the present embodiment, it is assumed that primary colors are RGBCMY in the form of first-order colors of additive mixture and subtractive mixture. Primary colors generally have high ability to express colors, and the primary colors tend to have maximum allowable saturations. In view of the above, primary colors in a printer color gamut are used as reference points for smoothing.

To reduce the color shift described above, a target color may be set in a color gamut recordable by both the overlapping region and the non-overlapping region. Such a common target color may be set in a several ways. For example, in a case where the locus Tx is included in a color gamut in which the locus Ty is located, the target color may be set such that Tx is adjusted with respect to Ty, or vice versa. In another example, a target color may be set in a common color space such as a shaded area shown in FIG. 1. For example, a locus Tz with a maximum density point located at Cz may be employed as a target color. In any case, the target color is set such that a reduction in difference in color between the overlapping region and the non-overlapping region is achieved by making a correction toward the target color.

In the example described above, colors are represented in the sRGB color space, However, in practice, colors may be represented in other color spaces. Regardless of in which color space the reference RGB values are expressed, the RGB values may be converted into the XYZ or CIE-L*a*b* color space, and a matrix may be generated such that the RGB values of given image data is converted by the generated matrix toward the reference values. This also applies when the RGB values are read as raw data, i.e., when the RGB values are in a device-dependent format. In this case, the RGB values read are assumed to be in an arbitrary RGB space (for example, the sRGB color space), and a transformation matrix is generated under the above assumption. The color correction data may be generated by any method as long as the RGB values read are corrected with respect to the reference RGB values. In the correction of colors, either the overlapping region or the non-overlapping region may be employed as the reference. Note that the correction accuracy depends on an image signal to be recorded. Alternatively, the color correction data may be generated such that a table of a target color is stored in advance in a ROM and the color correction data is generated such that both the non-overlapping region and the overlapping region are adjusted with respect to a target value.

In the present embodiment, as described above, patches are recorded by the overlapping region and the non-overlapping region of the overlapping head, the colors of the recorded patches are measured, and the color correction is performed according to the result of the measurement and can reduce the degradation in image quality due to a white streak or the like produced by a color shift caused by an ink dot positioning error.

Other Embodiments

Figure 12:
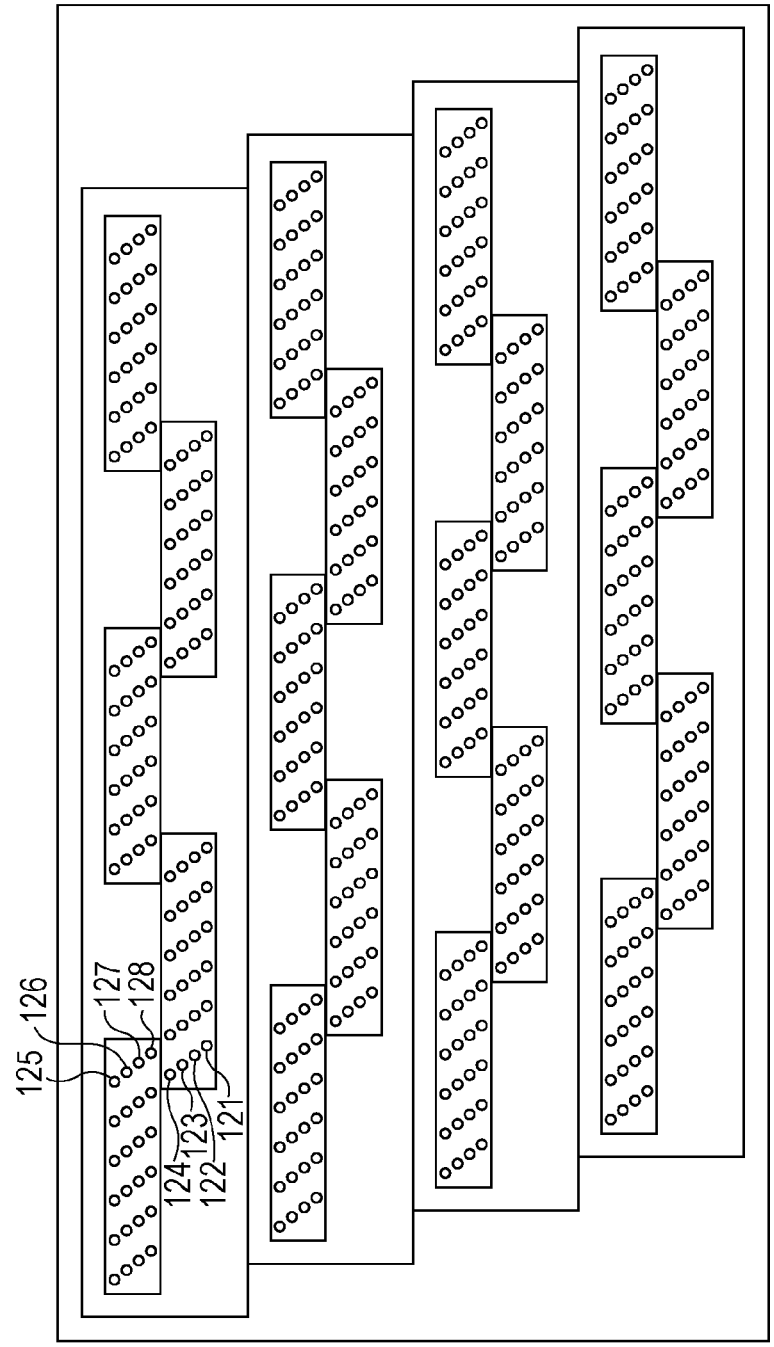
FIG. 12 is a diagram illustrating an overlapping head according to an embodiment of the present invention.
Figure 13:
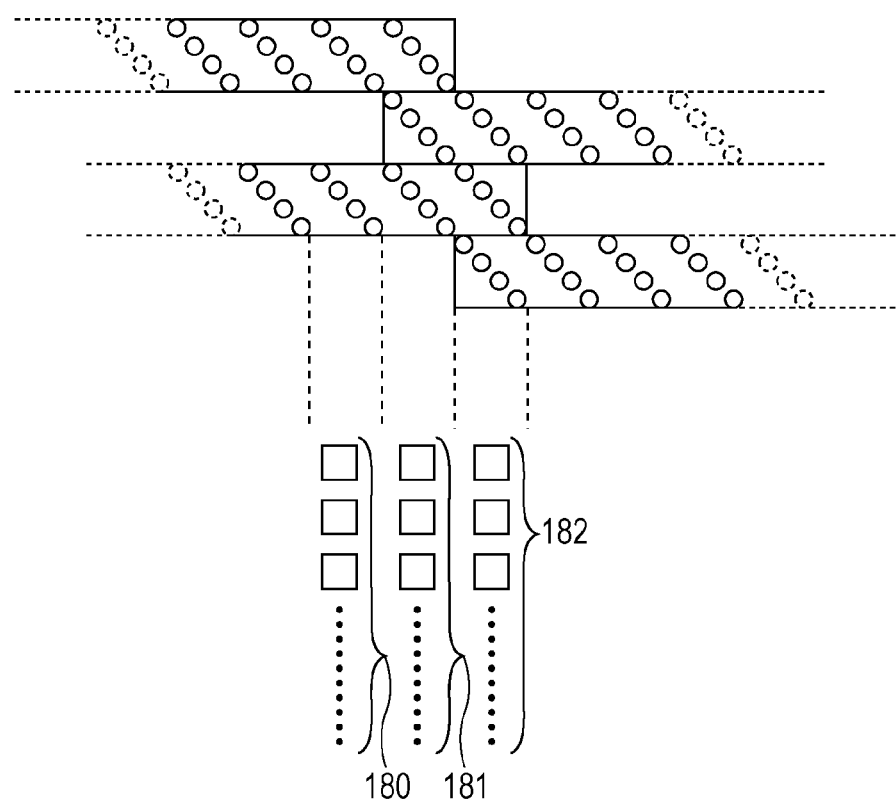
FIG. 13 is a diagram illustrating a test pattern according to an embodiment of the present invention.

In the embodiments described above, it is assumed by way of example that overlapping regions of recording head chips that discharge ink are located in the same area for all colors. However, the overlapping regions may be located in different manners. For example, the locations of overlapping regions may be different among ink colors as shown in FIG. 12. In this case, a test pattern is recorded in each area where a difference in a characteristic of a recording head occurs between a overlapping region and a non-overlapping region, and a color correction is performed for each area, because when the locations of overlapping regions are different among ink colors, colors are different among a chip group 180, a chip group 181, and a chip group 182 as shown in FIG. 13. That is, even if no color shift occurs when a single color is recorded by non-overlapping regions of the recording head, a color shift can occur when a plurality of colors are recorded, because a change in color is produced by a change in the manner in which dots of different colors overlap each other due to ink dot positioning errors.

In this case, a color correction may be performed such that a reference color gamut may be stored in a ROM and the color correction may be performed for all areas such that colors in the areas match the reference color. Alternatively, test patterns may be recorded in all areas and colors of the recorded test patterns may be measured for all areas. Thereafter, a common color reproduction space included in all color gamuts of the areas, i.e., a color gamut recordable in all areas may be determined. A target color may be set in the common color reproduction space, and the color correction may be performed such that the target color is achieved.

In the embodiments described above, it is assumed by way of example that recording is performed while conveying a recording medium with respect to the recording head. The recording may be performed in a different manner as long as the recording head and the recording medium move relative to each other. For example, the recording head may be moved instead of conveying the recording medium.

In the embodiments described above, it is assumed by way of example that the test pattern is recorded using the same patch data for both the overlapping region and the non-overlapping region. Alternatively, different path data may be used. That is, RGB values of the patch data may be different between the overlapping region and the non-overlapping region, and the number of patches may be different between the overlapping region and the non-overlapping region, as long as a color gamut can be determined for the overlapping region and the non-overlapping region by measuring colors of patches recorded by the overlapping region and the non-overlapping region.

When the distribution ratio of discharge ports in a non-overlapping region is set to be 100%, data to be recorded by an overlapping region of two recording head chips may be produced such that the total distribution ratio is not 100%. That is, the total number of dots recorded by the two recording head chips may be greater than 100% or smaller than 100% because such a deviation from 100% can occur due to a difference in expression of colors recorded by overlapping regions caused by a difference in permeation speed depending on the type of ink and the type of the recording medium.

In the embodiments described above, it is assumed by way of example that there is no difference between the colors recorded by non-overlapping regions of two recording head chips. In practice, there is a possibility that a difference occurs in colors recorded by non-overlapping regions of two recording head chips because of a difference in the amount of discharged ink, caused by a variation in characteristics of recording head chips or the like which can occur in a production process. In this case, a calibration may be performed based on a calibration pattern recorded by non-overlapping regions so that the same color is obtained for all non-overlapping regions. After that, the color correction described above may be performed.

In the embodiments described above, it is assumed by way of example that four colors of ink are used. A greater or smaller number of colors of ink may be used. Furthermore, in the embodiments described above, it is assumed by way of example that five gray levels are representable for each pixel. The number of gray levels representable for each pixel may be greater or smaller than five.

In the embodiments described above, it is assumed by way of example that the ink-jet recording system is configured such that the test pattern and the image data are received from the computer serving as an external data supplying apparatus, colors of the test pattern are measured using the external colorimeter, and the color correction data is generated by the computer. However, the ink-jet recording system may be configured in different manners. For example, the image data may be stored in the ink-jet recording apparatus. The colorimeter may be disposed in the ink-jet recording apparatus. The ink-jet recording apparatus may include a program stored therein to generate the color correction data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-290107 filed Dec. 22, 2009, which is hereby incorporated by reference herein in its entirety.

What is claimed is:

1. A data generating method for generating data for recording an image on a recording medium by using a recording head having a first discharge port group, a second discharge port group, a third discharge port group and a fourth discharge port group, wherein each of the first discharge port group and the third discharge port group includes a plurality of discharge ports for discharging a first ink, and each of the second discharge port group and the fourth discharge port group includes a plurality of discharge ports for discharging a second ink, wherein the recording head has a first discharge port array and a second discharge port array being arranged to be shifted from each other in the first direction and the first discharge port array and the second discharge port array form overlapping regions by overlapping an end region of the first discharge port array and an end region of the second discharge port array in a second direction crossing the first direction, and the recording head has a third discharge port array and a fourth discharge port array being arranged to be shifted from each other in the first direction and the third discharge port array and the fourth discharge port array form overlapping regions by overlapping an end region of the third discharge port array and an end region of the fourth discharge port array in the second direction crossing the first direction, wherein the overlapping regions formed by the first discharge port array and the second discharge port array and the overlapping regions formed by the third discharge port array and the fourth discharge port array being arranged to be shifted from each other in the first direction, the data generating method comprising:

obtaining first measurement results by measuring a first test pattern which has been recorded on a first part of the recording medium by discharging the first ink from the first discharge port group and by discharging the second ink from the second discharge port group, wherein the first discharge port group is included in the first discharge port array and not included in the overlapping region on the first discharge port array, and the second discharge port group is included in the third discharge port array and not included in the overlapping region on the third discharge port array;

obtaining second measurement results by measuring a second test pattern which has been recorded on a second part, different from the first part, of the recording medium by discharging the first ink from the third discharge port group and by discharging the second ink from the fourth discharge port group, and wherein the third discharge port group is included in the overlap region on the second discharge port array and the fourth discharge port group is included in the third discharge port array and not included in the overlapping region of the third discharge port array; and generating first correction data for correcting image data of an image to be recorded by the first discharge port group and the second discharge port group and second correction data for correcting image data of image to be recorded by the third discharge port group and the fourth discharge port group on the second part, based on the first measurement results and the second measurement results respectively.

2. The data generating method according to claim 1, further comprising obtaining first information on a first color gamut corresponding to the first discharge port group and the second discharge port group based on the first measurement results and obtaining second information on a second color gamut corresponding to the third discharge port group and the fourth discharge port group based on the second measurement results,
wherein, in the generating, the first correction data is generated based on the obtained first information and the second correction data is generated based on the obtained second information.

3. The data generating method according to claim 2, wherein in a case where one of the first color gamut and the second color gamut is included in the other color gamut, the first correction data and the second correction data correspond to the included color gamut.

4. The data generating method according to claim 2, wherein the first correction data and the second correction data correspond to a color gamut included in both of the first color gamut and the second color gamut.

5. The data generating method according to claim 1 further comprising, correcting image data to be recorded, based on the first color correction data and the second color correction data.

6. The data generating method according to claim 5, further comprising a recording step for recording an image on the recording medium using the recording head based on the data corrected.

7. The data generating method according to claim 1, wherein a result of measuring an image recorded by using the first discharge port group, based on data in which image data indicating a predetermined color has been corrected using the first correction data, and a result of measuring an image recorded by using the third discharge port group, based on data in which the image data indicating the predetermined color has been corrected using the second correction data, are substantially the same.

8. The data generating method according to claim 7 wherein one of the data in which the image data indicating the predetermined color has been corrected using the first correction data and the data in which the image data indicating the predetermined color has been corrected using the second correction data is data indicating that an image is to be recorded with the first ink and without the second ink different from the first ink, and the other is data indicating that an image is to be recorded with both the first ink and the second ink.

9. The data generating method according to claim 1, wherein a result of measuring an image recorded by using the first discharge port group and the second discharge port group, based on data in which image data indicating a predetermined color has been corrected using the first correction data, and a result of measuring an image recorded by using the third discharge port group and the fourth discharge port group, based on data in which the image data indicating the predetermined color has been corrected using the second correction data, are substantially the same.

10. The data generating method according to claim 1, wherein a color of the first ink is different from a color of the second ink.

11. The data generating method according to claim 1 further comprising, recording the first test pattern and the second test pattern.

12. The data generating method according to claim 1, wherein the first correction data and the second correction data are data for converting data including a plurality of components in a first color space into data including a plurality of components in a second color space.

13. A data generating apparatus for generating data for recording an image on a recording medium by using a recording head having a first discharge port group, a second discharge port group, a third discharge port group and a fourth discharge port group,
wherein each of the first discharge port group and the third discharge port group includes a plurality of discharge ports for discharging a first ink, and each of the second discharge port group and the fourth discharge port group includes a plurality of discharge ports for discharging a second ink,
wherein the recording head has a first discharge port array and a second discharge port array being arranged to be shifted from each other in the first direction and the first discharge port array and the second discharge port array form overlapping regions by overlapping an end region of the first discharge port array and an end region of the second discharge port array in a second direction crossing the first direction, and the recording head has a third discharge port array and a fourth discharge port array being arranged to be shifted from each other in the first direction and the third discharge port array and the fourth discharge port array form overlapping regions by overlapping an end region of the third discharge port array and an end region of the fourth discharge port array in the second direction crossing the first direction,
wherein the overlapping regions formed by the first discharge port array and the second discharge port array and the overlapping regions formed by the third discharge port array and the fourth discharge port array being arranged to be shifted from each other in the first direction,
the data generating apparatus comprising:
an obtaining unit configured to obtain first measurement results by measuring a first test pattern which has been recorded on a first part of the recording medium by discharging the first ink from the first discharge port group and by discharging the second ink from the second discharge port group, wherein the first discharge port group is included in the first discharge port array and not included in the overlapping region on the first discharge port array, and the second discharge port group is included in the third discharge port array and not included in the overlapping region on the third discharge port array, and to obtain the second measurement results by measuring a second test pattern which has been recorded on a second part different from the first part, of the recording medium by discharging the first ink from the third discharge port group and by discharging the second ink from the fourth discharge port group, and wherein the third discharge port group is included in the overlap region on the second discharge port array and the fourth discharge port group is included in the third discharge port array and not included in the overlapping region of the third discharge port array; and
a generation unit configured to generate first correction data for correcting image data of an image to be recorded by the first discharge port group and the second discharge port group and second correction data for correcting image data of image to be recorded by the third discharge port group and the fourth discharge port group on the second part, based on the first measurement results and the second measurement results respectively.

14. The data generating apparatus according to claim 13, wherein a result of measuring an image recorded by using the first discharge port group, based on data in which image data indicating a predetermined color has been corrected using the first correction data, and a result of measuring an image recorded by using the third discharge port group, based on data in which the image data indicating the predetermined color has been corrected using the second correction data, are substantially the same.

15. The data generating apparatus according to claim 14 wherein one of the data in which the image data indicating the predetermined color has been corrected using the first correction data and the data in which the image data indicating the predetermined color has been corrected using the second correction data is data indicating that an image is to be recorded with the first ink and without the second ink different from the first ink, and the other is data indicating that an image is to be recorded with both the first ink and the second ink.

16. The data generating apparatus according to claim 13, wherein a result of measuring an image recorded by using the first discharge port group and the second discharge port group, based on data in which image data indicating a predetermined color has been corrected using the first correction data, and a result of measuring an image recorded by using the third discharge port group and the fourth discharge port group, based on data in which the image data indicating the predetermined color has been corrected using the second correction data, are substantially the same.

17. The data generating apparatus according to claim 13 further comprising, a controlling unit configured to control the recording head to record the first test pattern and the second test pattern.

* * * * *